March 21, 1933.  G. A. PAGE, JR  1,902,094
RUDDER PEDAL ADJUSTING MECHANISM
Filed May 12, 1930
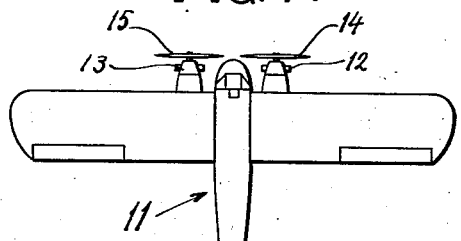
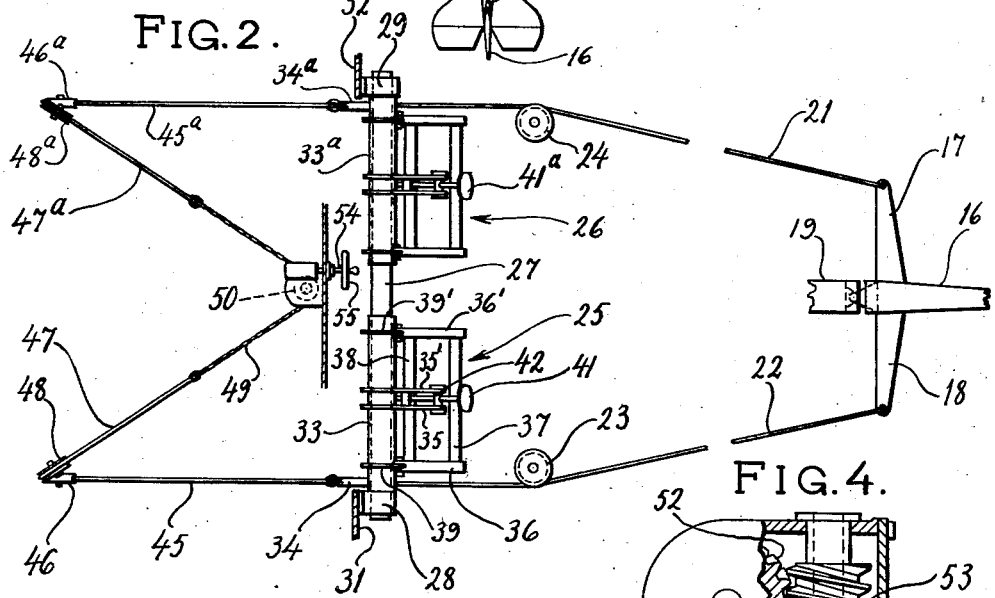
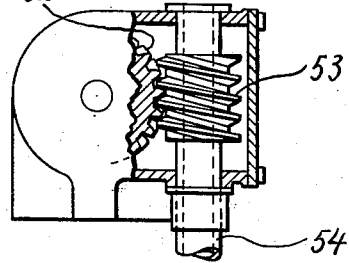
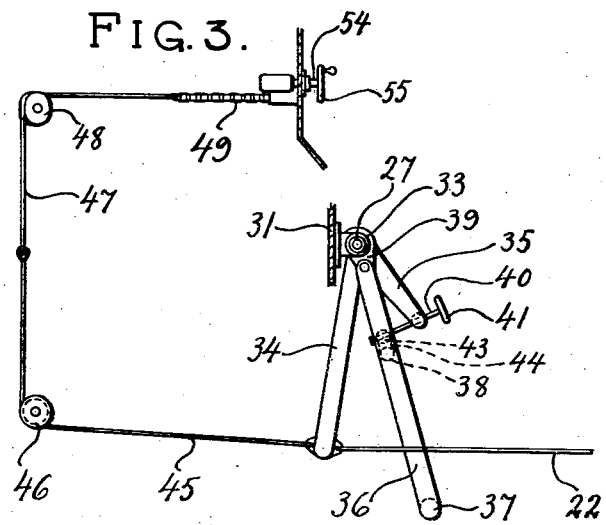
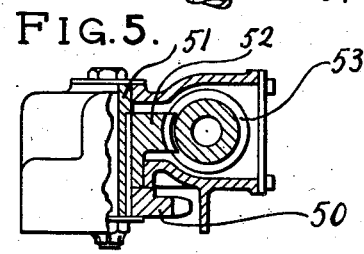
INVENTOR
GEORGE A. PAGE Jr.
BY
ATTORNEY Patented Mar. 21, 1933

1,902,094

UNITED STATES PATENT OFFICE

GEORGE A. PAGE, JR., OF FREEPORT, NEW YORK, ASSIGNOR, BY MESNE ASSIGNMENTS, TO CURTISS AEROPLANE & MOTOR COMPANY, INC., A CORPORATION OF NEW YORK

RUDDER PEDAL ADJUSTING MECHANISM

Application filed May 12, 1930. Serial No. 451,548.

This invention relates in general to aircraft, and more particularly to an improved apparatus for operating control surfaces such as may be used thereon or in connection therewith.

The invention comprises in some respects an improvement on the device described in a patent to Theodore P. Wright and Wm. Wait, Jr., No. 1,694,496.

One of the objects of this invention is to devise a new and improved system of pedal controls for operating one or more of the control surfaces of an aerial vehicle, wherein the pedals may be individually adjusted forward and backward relative to the pilot's seat even while the aerial vehicle is in flight and while the aerial vehicle is continuously maintained under full control whereby greater comfort may be provided for the pilot regardless of the length of his legs.

A further object is to provide a new and improved system of pedal control for operating the rudder or rudders of an airplane wherein improved means are included for relieving the pilot of the continuous effort often necessary heretofore to keep a multi-motored ship from yawing when one of the motors is not operating.

A further object is to provide a system of control of the nature disclosed operable normally to maintain quasi-automatically a substantially straight course regardless of whether the thrust is along the longitudinal axis of the airplane or not.

A further object is to provide means for adjusting the rudder controls of a multi-motored aerial vehicle to maintain normally straight flight even though one of the motors thereof is not operating at full efficiency and in combination therewith to provide means whereby the pedals for operating the controls may be adjusted to such a position that they may be comfortably operated by the pilot regardless of the first mentioned adjustment.

Further objects of my invention will be apparent from a reading of the subjoined specification and claims and from a consideration of the accompanying drawing.

In order to explain the invention more clearly, one embodiment thereof is shown in said drawing, in which:

Fig. 1 is a plan view of an airplane equipped with two motors and in which my invention is installed;

Fig. 2 is a plan view of parts of said airplane on a very much enlarged scale showing diagrammatically the rudder, rudder pedals and the rudder control cables;

Fig. 3 is a diagrammatic view in elevation of part of the apparatus of Fig. 2;

Fig. 4 is a plan view with parts in section of a detail of the apparatus shown in Fig. 2 on a still further enlarged scale; and Fig. 5 is a view in elevation with parts in section of the detail shown in Fig. 4.

Referring in detail to the drawing, wherein like numerals are used to indicate the same or similar parts, I have shown in Fig. 1 an airplane 11 equipped with motors 12 and 13 designed to drive the propellers 14 and 15, respectively. The airplane is equipped with the usual control surfaces including a rudder 16 and a vertical stabilizer or fin 19. As shown in Fig. 2 the rudder 16 is provided with a pair of horns 17 and 18 to which are attached the rudder cables 21 and 22, respectively. These cables are carried forward within said airplane to a point adjacent the cockpit thereof, passing over suitable pulleys such as the pulleys 23 and 24. At their forward ends the cables are secured to parts of the rudder pedal assemblies 25 and 26, respectively.

The rudder pedal assemblies are arranged so that the rudder may be operated thereby and also so that the foot treads thereof may be adjusted to conform to the length of the leg of the pilot. For supporting the pedal assemblies there is provided a tube or rod 27 extending transversely of the airplane and mounted in lugs 28 and 29. These lugs are secured as at 31 and 32 to fixed parts of the fuselage of the airplane. Appropriately spaced respectively on the left hand side and on the right hand side of the rod 27 (looking forward) are sleeves or bearings 33 and 33ª, forming parts of the rudder pedal assemblies 25 and 26, respectively. Inasmuch as both of the rudder pedal assemblies 25 and 26 are similar, it is thought that a detailed description of one will suffice for both. The sleeve 33 is formed with an offset arm 34, to the lower end of which the cable 22 is secured. Thus movement of the arm 34 forward tends to turn the rudder 16 to the left (looking at the airplane as shown in Fig. 1) and therefore tends to turn the airplane toward the left. The sleeve 33 is also provided with a pair of parallel spaced plates or arms 35 and 35' for purposes now to be described. A separate operating pedal is provided in the rudder pedal assembly and comprises a pair of parallel frame members 36 and 36' secured to each other by a pair of transverse frame members 37 and 38. The lower of the two transverse frame members, that is the member 37, forms a foot tread upon which the pilot's foot is intended to rest. The upper ends of the frame members 36 and 36' are respectively pivotally secured to a pair of spaced lugs or plates 39 and 39' which are formed integrally with the sleeve 33. In order to maintain the tread 37 and the operating pedal in an adjustably fixed position relative to the sleeve 33 and therefore relative to the arm 34, there is provided an adjusting screw 40 formed with a hand wheel 41. This screw is threaded through a spacing member or bolt 42 inserted between the lower ends of the arms 35 and 35'. The lower end of the screw 40 is rotatably secured in a bolt 43 mounted between spaced lugs secured to the frame member 38. One of the lugs is shown in dotted lines in Fig. 3 and is designated 44.

Means are also provided for holding the pedal assemblies 25 and 26 and therefore the rudder 16 resiliently in any desired position. Thereby, when both motors are operating with substantially equal power, the rudder may be normally held resiliently in a position with its axis coinciding with the extended axis of the fuselage of the airplane. However, if one of the motors should be operating less efficiently than the other, the resilient means may be so adjusted that the rudder will be normally held resiliently in a position offset from the center line of the fuselage so that regardless of the offset thrust of the motors, the airplane may fly in a substantially straight course without continuous muscular effort being required of the pilot for the purpose of holding the rudder offset. This resilient means comprises a cable 45 secured to the lower end of the arm 34 and extending forward therefrom and around a pulley 46. Thereafter, it extends upward and is connected to a rubber cord 47 which passes around a pulley 48. The opposite end of the rubber cord 47 is fastened to a sprocket chain 49 which passes rearward around a sprocket wheel 50. Passing forward therefrom, the sprocket chain is connected to another rubber cord 47ª which after passing over pulley 48ª is in turn connected to a cable 45ª. Said cable 45ª passes over pulley 46ª and is secured at its opposite end to the lower part of the arm 34ª. The arm 34ª forms part of the rudder pedal assembly 26 and to it is also secured the forward end of the cable 21. As shown more clearly in Figs. 4 and 5 the sprocket wheel 50 is secured to an idler shaft 51 which carries also a worm wheel 52. The worm wheel 52 is adapted to be turned by a worm 53 carried on a shaft 54 which also carries (see Figs. 2 and 3) a hand wheel 55. Thus, operation of the hand wheel 55 turns the worm 53 and the worm wheel 52. This movement turns the sprocket wheel 50 and moves the sprocket chain 49 either to the right or to the left depending upon the direction in which the wheel 55 is turned. If the movement of the sprocket chain 49 is toward the right of the airplane looking forward, greater tension will be put upon the rubber cord 47 and the cable 45 and the pedal assembly 25 will be urged forward. At the same time less tension will be put upon the rubber cord 47ª and the cable 45ª and the pedal assembly 26 will be allowed to move backward. Consequently the rudder 16 will be urged toward the left and the airplane will tend to turn in the same direction. Turning of the hand wheel 55 in the opposite direction has opposite results.

In the operation of an aerial vehicle built with devices constructed according to my invention, the pilot will probably, before taking off, see that the hand wheel 55 is so adjusted that the rudder 16 is normally held in line with the longitudinal axis of the fuselage. If the adjustment thereof is not as desired he may turn the said hand wheel 55 either in one direction or the other, thus moving the sprocket chain 49 and tightening one of the rubber cords 47 or 47ª. The tension on said rubber cord will urge one of the rudder assemblies 25 or 26 forward and thus tend to turn the rudder 16 to the desired position. He may also adjust the pedal assemblies 25 and 26 by turning one or both of the hand wheels 41 and 41ª. For instance he may operate the hand wheel 41 and thus move the associated frame and tread 37 either forward or backward relative to the arm 34 so that the tread 37 is positioned comfortably for him. Thereafter, he will take off with the airplane and if necessary for any cause may, while in flight, adjust the hand wheel 55 to correct the normal position to which the rudder is resiliently urged so that the airplane will fly in a straight course. Assuming that after flying for some time one of the motors 12 or 13 ceases operating so that there is an offset thrust and the airplane tends to fly along a curved path, the pilot may then adjust the devices to cause the airplane to fly again on a straight course. He will do this by rotation of the hand wheel 55 in the desired direction to tend to turn the rudder 16 to the desired position so that the rudder will counterbalance the one-sided thrust of the motor and will cause the airplane to fly again in a straight line. This adjustment of the wheel 55 will create a tendency for one of the rudder pedal assemblies to move forward and for the other to move backward so that in normal flight one leg of the pilot would have to be stretched ahead and the other contracted. The pilot will therefore also adjust the hand wheels 41 and 41ª so as to move both pedals back to their original in-line normal position, at the most comfortable distance from the seat.

It is to be understood that the above described embodiment of the invention is for the purpose of illustration only and various changes may be made therein without departing from the spirit and scope of the invention.

I claim as my invention:

1. In an aerial vehicle, a rudder, a rudder pedal for controlling said rudder, a sleeve bearing upon which said rudder pedal is pivotally mounted, an offset arm also secured to said sleeve bearing, a shaft upon which said sleeve bearing is mounted, connections extending between said offset arm and said rudder, and a screw adjustably secured to said offset arm and also secured to said pedal.

2. In an aerial vehicle, a rudder, a pair of pedals for controlling the operation of said rudder, connections between said pedals and said rudder, resilient connections extending from said pedals for resiliently holding the rudder in the same line as the lonigtudinal axis of the aerial vehicle, a sprocket chain secured to said resilient connections, and an adjusting wheel for moving said sprocket chain and thereby adjusting said resilient means so that the rudder may be held resiliently in a position offset from the straight line forming the longitudinal axis of the aerial vehicle.

3. In an aerial vehicle, a rudder, a device for controlling said rudder, connections extending between said device and said rudder, a resilient connection extended from said device, a sprocket chain secured to said resilient connection, and means for moving said sprocket chain to increase or decrease optionally the tension in said resilient connection and for thus moving the normal position of said device either backward or forward.

4. In an aerial vehicle, a rudder, a pair of rudder pedals for controlling the operation of said rudder, connections extending between said rudder pedals and said rudder, means for resiliently holding the rudder pedals and the rudder substantially in a neutral position, means for moving said holding means so that said rudder and rudder pedals will be resiliently moved from their normal neutral position, and means independent of said last named means for adjusting said rudder pedals back to their normal neutral position.

5. In an aerial vehicle, a rudder, a rudder pedal, a sleeve bearing upon which said rudder pedal is pivotally mounted, a shaft upon which said sleeve bearing is mounted, an offset arm secured to said sleeve bearing, a connection extending between said offset arm and said rudder, a second offset arm mounted on said sleeve bearing, and a screw adjustably secured to said second offset arm and also secured to said pedal.

6. In an aerial vehicle, a control surface, control means for said surface, connections extending between said surface and said control means, resilient means normally holding said control means in a neutral position, an adjusting mechanism adapted to move said resilient means to vary said control means from its neutral position, and means for changing the position of said control means independently of the position of said control surface.

7. In an aerial vehicle, a rudder, a pair of pedals for controlling said rudder, means extending from said rudder pedals for holding said rudder resiliently in the same line as the longitudinal axis of said aerial vehicle, means operable for adjusting said resilient means to change the position at which the rudder is resiliently held from said straight line, and adjusting means for changing the position of said rudder pedals independently of the position of said rudder.

8. In an aerial vehicle, a rudder, a pair of arms, connecting means extending from said rudder to said arms, means extending from said arms for holding said rudder resiliently in the same line as the longitudinal axis of said aerial vehicle, means operable for adjusting said resilient means to change the position at which the rudder is resiliently held from said straight line, a pair of pedals, and a pair of adjustable connections, each joining one of said arms and one of said pedals.

In testimony whereof I hereunto affix my signature.

GEORGE A. PAGE, Jr.